United States Patent [19]

Eichholz et al.

[11] 4,011,127
[45] Mar. 8, 1977

[54] TIRE BUILDING DRUM

[75] Inventors: Werner Eichholz; Gerd Krebs, both of Hamburg, Germany

[73] Assignee: Phoenix Gummiwerke Aktiengesellschaft, Hamburg, Germany

[22] Filed: Apr. 8, 1975

[21] Appl. No.: 566,102

[30] Foreign Application Priority Data

Apr. 17, 1974 Germany ............................ 2418410

[52] U.S. Cl. .................................. 156/416; 74/585; 92/35; 156/132; 156/401; 156/403; 248/400; 267/35

[51] Int. Cl.² ........................................ B29H 17/22

[58] Field of Search .......... 156/126, 131, 132, 398, 156/400–403, 416; 74/521, 585; 248/400; 267/21 R, 35, 57.1 R, 63, 65 R, 69; 92/34, 35, 43, 44

[56] References Cited

UNITED STATES PATENTS 3,053,308 9/1962 Vanzo et al. ..................... 156/132
3,160,407 12/1964 Vaugoyeau ........................ 267/35
3,692,605 9/1972 Cantarutti ......................... 156/132
3,721,600 3/1973 Cantarutti ......................... 156/131
3,853,653 12/1974 Olbert et al. ...................... 156/132

Primary Examiner—Charles E. Van Horn
Assistant Examiner—John E. Kittle
Attorney, Agent, or Firm—Allison C. Collard

[57] ABSTRACT

A tire building drum for assembling and shaping green tire carcasses toroidal includes a central drum and side drums with membranes capable of being blown up to shape the tire carcass. Supporting rings are located on opposite sides of the central drum. The invention is characterized in that the core supporting ring consists of an elastomeric material with a high E-modulus and is provided on the inner side with a disk-shaped flange supported in a groove, the flange having concentric collapsible grooves and being capable of extending radially under air pressure.

5 Claims, 3 Drawing Figures

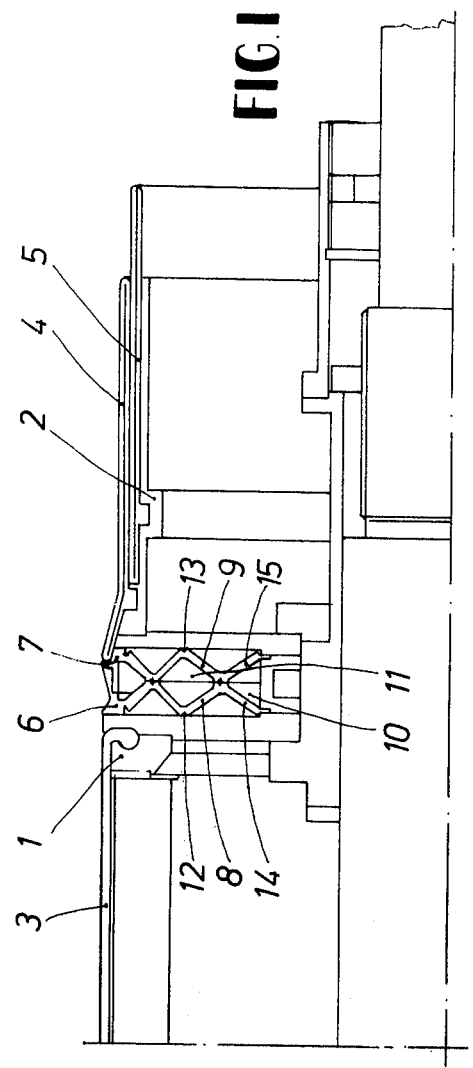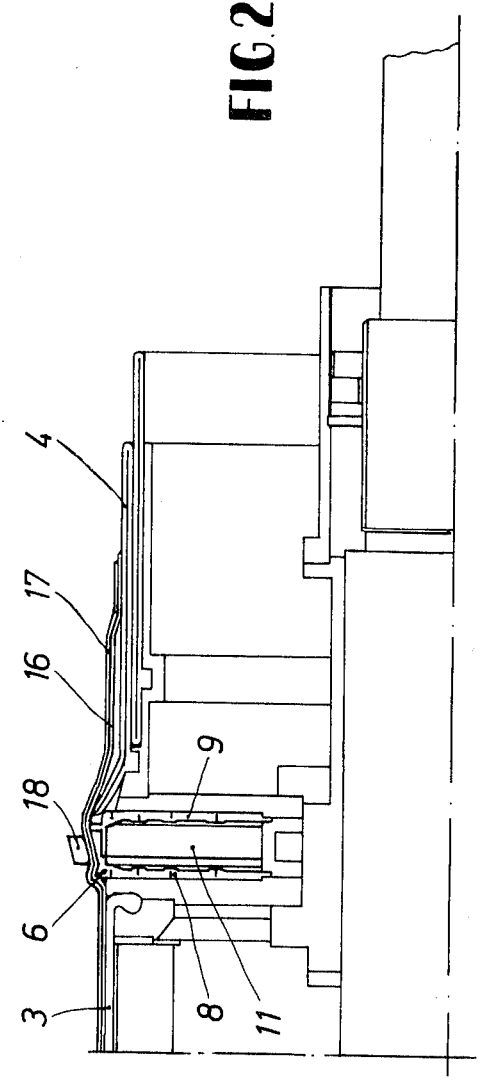

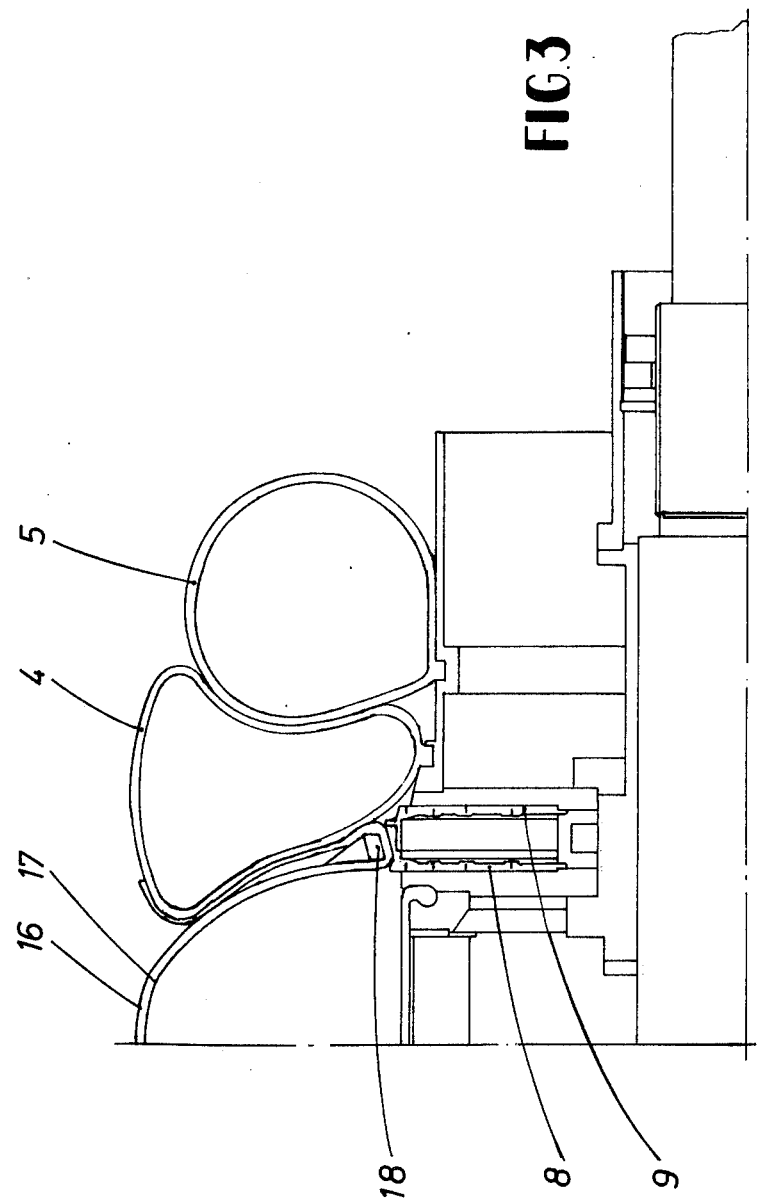

TIRE BUILDING DRUM

This invention relates to a tire building drum for assembling and shaping green tire carcasses toroidal, which includes a central drum and side drums with membranes capable of being blown up for folding the ends of carcass plies. Supporting rings for the bead core are located on opposite sides of the central drum.

As is known, the manufacture of air tires with belt plies requires considerable expenditure, since it takes place in two stages. In the first stage the cylindrical rough body is produced with the wire inserts. In the second stage the body curved toroidally receives the belt and the running strip.

Tire building drums have been suggested already, wherein the two stages can be carried out upon the same drum. This is made possible by covering the central drum with rubber membranes capable of being blown up and providing side drums with other rubber bellows. The placing of coverings upon the core can take place as soon as the rough bodies have received the toroidal shape.

When operating these drums it was found difficult to place the inserts of wire precisely upon the provided locations. Namely, on the one hand the wire rings must lie tight upon the tissue of the rough tire bodies and, on the other hand, a light placing must be also made possible. This has resulted so far in substantial difficulties, although the side drums were provided with a step-wire radial recess.

An object of the present invention is to provide a construction for the drums of the described type, wherein the insert rings can be placed with great precision.

Another object is to make possible a firm holder between the core insert and the body inserts which enclose it.

Other objects will become apparent in the course of the following specification:

In the accomplishment of the objectives of the present invention it was found desirable to provide the described drum with a core supporting ring of elastomeric material having a high E-modulus and provided upon the inner side with a disk-shaped flange supported in a groove and having concentric collapsible grooves. Such a core supporting ring can consist, for example, of a polyester urethane with a shore hardness A of about 90°. The flange can be extended by compressed air due to its special shape and the placing in a groove. Thus the supporting ring can be radially spread to a predetermined extent. The measurements of the flange and the bending shape make it possible to fix the radial passage precisely in advance. During the spreading of this ring the supporting surface presses the body inserts lying thereon with pressure adjustable at will against the insert wire of the pad. In this stage the wire upon the central drum can be changed to a toroidal shape by the blowing of the membranes. Even short fabric enclosures can not slide under the pad wire since high pressure can be set at will.

This construction of the present invention not only provides a substantial simplification in the manufacture of belt tires but also provides safety relatively to the precision of rings which is independent from the manner of operation. Due to the provision of side membranes lying upon the side drums the netting inserts can be pressed uniformly and with sufficient pressure upon the bead core rings during the fixing of pad inserts.

According to the present invention it was found advantageous to provide the supporting part of the core supporting ring in cross-section with a substantially U-shaped trough. This trough can be adapted precisely to the tire foot, so that a construction is provided which is advantageous for the vulcanization of the tire. At the same time an effective pressing is produced over a large surface due to the U-shape of the trough, which adds to the requirement for precision of the tire rings.

According to a further feature of the present invention the supporting part of the core supporting ring can be provided with a further side ring supporting membrane, which is shaped stepwise and can spring rearwardly. This provides a transmission of the core supporting ring to the side membranes of the side drum. The result is a smooth transmission which is important for the placing of the first cord netting position for the tire body.

A further feature of the present invention consists in that the membrane supporting ring also has a disk-shaped flange supported in a groove and having concentric collapsible grooves. Due to this arrangement the supporting surface for the tire carcass can be widened during the widening of the core supporting ring. This feature improves the uniform shape changing of the cord nettings for the body.

A further feature of the present invention can provide that the flanges of the core supporting ring and of the membrane carrying rings, which are provided with concentric collapsible grooves, are placed mirror-like opposite each other. This arrangement which produces a common action of the membrane supporting ring and of the core supporting ring during the spreading, also supports the flanges relatively to each other when they are at rest. Thus the precise radial measure for both parts is also provided when they are not tensioned.

In order to facilitate the manufacture of these core and bellows supporting rings with flanges, they preferably consist of parts lying loosely next to each other. This arrangement constitutes a particularly important part of the present invention, since it makes possible the creation of a closed system. Since the flange parts supported at the bottom of the trough are set air tightly and since the core supporting ring and the membrane supporting ring can consist of one part or be air-tightly interconnected, a closed space is produced between the two flanges which can be subjected to compressed air. This makes it possible to eliminate consideration of all other endeavors concerning air tightness. Furthermore, under these conditions the spreading can be carried out with comparatively small air pressure. Due to these conditions the two flanges can be also a part of the core supporting ring, while the membrane supporting ring can be considered to be only a continuation of the core supporting ring.

Furthermore, the present invention can provide that the flanges of the core supporting ring and of the membrane supporting ring have annular notches at the sides located opposite the bending locations. This operates the bending procedure in predetermined manner, when the core supporting ring and the membrane supporting ring are spread or pulled together. It is advisable to provide several bending grooves for the disk-shaped flanges. This provides a larger stretching passage so that a radial spreading is possible to any desired extent. Furthermore, it was found advantageous to provide different sizes for the ring-shaped parts of flanges between the bending grooves. This makes it possible to take into consideration the different path which the inner parts must take relatively to the outer parts.

It is advantageous when the angles at the bending locations of the flanges at the radially inwardly lying zone section are smaller than those at the radially outwardly lying section. This provides that the inner parts extend initially before there is a substantial extension of the outer parts. Due to the larger angle it is possible to provide a larger force even with small pressure.

The invention will appear more clearly from the following detailed description when taken in connection with the accompanying drawings showing by way of example only, a preferred embodiment of the inventive idea.

In the drawings:

FIG. 1 is a section through the right-hand side of the upper half of a composition drum for making certain tires.

FIG. 2 is similar to FIG. 1 and shows the first operating stage of the composition drum.

FIG. 3 is similar to FIG. 1 and shows the second operating stage.

While the drawings show only the right-hand side upper half of a drum the corresponding lower and side portions of the drum are mirror-like and symmetrical thereto.

FIG. 1 shows the right-hand upper half of a drum as consisting substantially of a central drum 1 and a side drum 2. The central drum 1 is provided with a rubber bellows 3 which makes possible the extension of drum slugs to a toroidal shape after the fixing. This membrane 3 can be blown up for that purpose. The side drum 2 carries hollow membranes 4 and 5 of rubber which can be blown up and which serve the purpose of folding the ends of the carcass plies. The core supporting ring 6 consists of a hard elastomeric material. It cooperates with the bellows supporting ring 7 consisting of the same material. The two rings 6 and 7 have flange-like radially inwardly directed parts 8 and 9 which are airtightly clamped at the bottom of the groove 10. When the space 11 is subjected to air pressure, the bent parts 8 and 9 will lie against the walls while propping up the core supporting ring 6 and the bellows supporting ring 7, as shown in FIG. 2. The flanges 8 and 9 are provided with notches 12 and 13 in order to make certain that the bending process may be carried out with precise steering. Furthermore, the flange parts 14 and 15 located between the bending locations are wider than the parts located beyond them and, furthermore, they have a greater angle to the radial symmetrical plane, so that when the spreading takes place by air pressure first the radical inner lying ring zones will spread and later the radial outwardly lying ring zones. Due to this arrangement the radial spreading is always maintained in precise coaxial measures. When air pressure is fixed, the specific pressure with which the core supporting ring is pressed against the tire pad, will rise, since the transmission relationship becomes greater the closer is the approach of the flange parts to the groove wall. Thus the rings 6, 7 are separate non-attached horizontal pieces, both with radially inward extending pieces to cause their radial expansion. These folded and notched annular radially inward extending pieces cause radial expansion of the supports for the bead core rings for the elimination of folds therein by air inflation.

FIG. 2 illustrates the first operating stage of the winding drum. Upon the membranes 3, 4 and 5 are placed nettings 16 and 17. Furthermore, the core 18 is located upon the core supporting ring 6. Due to increased air pressure in the space 11 the flange rings 8 and 9 have been stretched and thus the nettings 16 and 17 are firmly pressed against the core 18. In the moved out condition it can be easily placed in its precise position. Due to radial pressure and the U-shaped cross-section of the core ring 6 at its outer surface, the ring 18 is forcibly pressed precisely in its predetermined position.

FIG. 3 shows the second operational stage of the working process. The central portions of the netting 16 and 17 is shaped under pressure. The membranes 4 and 5 press the netting parts around the core 18 and firmly to the side wall of the tire. Due to the spacing of the flanges 8 and 9 the tire slug is held with great force in its position during the shaping procedure. tire sliding or an undesired shaping of the wire body relatively to the wire core 18 is completely avoided.

What is claimed is:

1. A tire building drum for assembling and shaping tire carcasses toroidal, comprising a central durm, and two side drums, an inflatable membrane carried by said central drum, inflatable membranes carried by said side drums, means forming radial grooves located between the central drum and each side drum, a core supporting ring and membrane supporting ring both of elastomeric material having a shore hardness A of about 90°, said membrane supporting ring located axially outwardly of, adjacent to, and in overlapping contact with the core supporting ring to form a composite cylindrical ring structure axially spanning said groove, and flanges located in said groove, one of said flanges being connected to the axially inward end of each core supporting ring and extending to the bottom of said groove at the axially inward edge and one of said flanges being connected to the axially outward end of each membrane supporting ring and extending to the bottom of said groove at its axially outward edge, said flanges consisting of annular discs with bent interconnected movable portions with the bends of the core and membranes supporting rings flanges being in mirror image so that when radially collapsed alternate bends in each pair of core and membrane supporting rings flanges contact each other and contact the side walls of the groove and when radially expanded the bends are substantially removed from the flanges and they are pressed out of contact with each other and against the side walls of said grooves, and means to introduce air pressure between said flanges to radially expand the flanges and thus the core and membrane support rings attached thereto and supported by said flanges.

2. A drum in accordance with claim 1, wherein said core supporting ring has a u-shaped portion in the radial outer surface of the axial crossections thereof.

3. A drum in accordance with claim 2, wherein said membrane supporting ring engages at least one of the membranes carried by said side drum.

4. A drum in accordance with claim 3, wherein said movable portions of the flanges have annular grooves at the points of bending.

5. A drum in accordance with claim 4, wherein said movable portions of the flanges have notches located opposite said grooves at the points of bending.

* * * * *